(12) United States Patent
Eckardt

(10) Patent No.: US 7,667,146 B2
(45) Date of Patent: Feb. 23, 2010

(54) ATTACHMENT DEVICE FOR ATTACHING AN ELECTRICAL OR ELECTRONIC DEVICE TO A TOP-HAT RAIL

(75) Inventor: Marco Eckardt, Markdorf (DE)

(73) Assignee: i f m electronic GmbH, Essen (DE)

( * ) Notice: Subject to any disclaimer, the term of this patent is extended or adjusted under 35 U.S.C. 154(b) by 123 days.

(21) Appl. No.: 11/952,221

(22) Filed: Dec. 7, 2007

(65) Prior Publication Data

US 2008/0146055 A1 Jun. 19, 2008

(30) Foreign Application Priority Data

Dec. 15, 2006 (DE) ............... 10 2006 059 863

(51) Int. Cl.
 *H05K 7/14* (2006.01)
(52) U.S. Cl. ............... 174/541; 174/535; 361/809
(58) Field of Classification Search ........... 174/541, 174/535, 520; 361/807, 809
 See application file for complete search history.

(56) References Cited

U.S. PATENT DOCUMENTS

| | | | |
|---|---|---|---|
| 6,563,697 B1 * | 5/2003 | Simbeck et al. ............. 361/668 |
| 6,741,452 B1 * | 5/2004 | Liu et al. .................... 361/631 |
| 6,770,813 B1 * | 8/2004 | Ramsagar et al. ........... 174/525 |
| 6,771,516 B1 * | 8/2004 | Leman et al. ............... 361/825 |
| 6,880,243 B2 * | 4/2005 | Ireland ....................... 29/840 |
| 6,940,014 B1 * | 9/2005 | Smith et al. ................ 174/562 |
| 7,170,758 B1 | 1/2007 | Hanning et al. |
| 7,286,340 B2 * | 10/2007 | Karim et al. ............... 361/647 |
| 7,430,129 B1 * | 9/2008 | Peng ......................... 361/807 |
| 7,561,441 B1 * | 7/2009 | Chang ........................ 361/801 |

FOREIGN PATENT DOCUMENTS

| | | |
|---|---|---|
| DE | 80 01 902 U1 | 5/1980 |
| DE | 94 06 386.9 U1 | 6/1994 |
| DE | 10 2005 021 841 B4 | 4/2007 |

* cited by examiner

*Primary Examiner*—Hung V Ngo
(74) *Attorney, Agent, or Firm*—David S. Safran; Roberts Mlotkowski Safran & Cole, P.C.

(57) ABSTRACT

An attachment device for attachment of an electrical or electronic device to a top-hat rail, including an attachable or integrated carrier plate, and a lockable fastener. The carrier plate has a holding device. The fastener is axially movable relative to the carrier plate and has an elongated base region, metal catch hooks, and a spring tongue punched out of the base region. The carrier plate has a projection protruding in a direction of the fastener, and arranged corresponding to the spring tongue. In a mounted state, the spring tongue is deflected by the projection so that the catch hooks are pulled against the top hat rail by a reset force thereof

14 Claims, 5 Drawing Sheets

ATTACHMENT DEVICE FOR ATTACHING AN ELECTRICAL OR ELECTRONIC DEVICE TO A TOP-HAT RAIL

BACKGROUND OF THE INVENTION

1. Field of Invention

The present invention generally relates to attachment devices for attachment of electrical or electronic devices, and more particularly to an attachment device for attachment of an electrical or electronic device to a top-hat rail.

2. Description of Related Art

In construction of equipment and installations, it is conventional to attach electrical or electronic devices, such as control and regulation devices, signal converters, and power supply units, to top-hat shaped mounting rails or top-hat rails. The electrical or electronic devices and their housings have an insertion region for such a purpose, with corresponding guide grooves or holding devices on one side of the insertion region, while on the other, opposite, side of the insertion region there is a movable, spring-pretensioned, bolt with one or two attachment hooks. Instead of forming guide grooves and the spring-loaded bolt directly on the housing of the device, use of a separate carrier plate attached or screwed to the housing can be employed.

There are several requirements with respect to attachment of such devices to the top-hat rail. First of all, it is often desirable for the device to be easily removable from the top-hat rail. For this purpose, in known attachment devices, the spring-loaded bolts generally have an actuation opening for insertion of a screwdriver so that the bolt can be pulled back against the spring force of the springs and thus the device can be removed from the top-hat rail. At the same time, the spring-loaded bolts ensure that the attachment device cannot unintentionally detach or be removed from the mounting rails.

German Patent Application No. DE 80 01 902 U1 discloses an electrical switching device for seating on a top-hat rail, wherein on its housing on one side of the insertion region there being a stationary guide groove and on the other, opposite, side of the insertion region there being a movable bolt with an attachment hook. The bolt or slide, which is located in a guide groove made in the housing bottom, has two guide bridges, which are vertically offset on the long side, and which in their middle region are provided on the inside at a distance and parallel to one another with opposite elastic lever arms. Because the bolt or slider is produced in one piece from elastic plastic, the use of a separate spring need not be employed.

German Patent Application No. DE 10 2005 028 841 B4 discloses an electrical switching device, which can be locked onto a mounting rail by a stationary projection being formed on the bottom of the housing facing the mounting rail, and additionally by a second attachment projection being implemented by a movable slide located in a guide groove in the housing. The slide in addition to the second attachment projection has a spring rod, which is supported in the housing in the mounted state of the slide. The spring rod being made on the side of the slide opposite the second attachment projection results in that the second attachment projection can be located in the vicinity of one face side of the switching device so that the attachment device is located highly decentralized with respect to the back of the housing and thus the switching device can also be attached to the mounting rail when the installation space is greatly limited on the end side.

German Patent Application No. DE 20 2005 010 601 U1 discloses a modular cap housing for seating on a mounting rail, the housing having a locking means with two locking slides, which can be moved relative to one another, and which are integrally interconnected via a spring. The two locking slides each have hook-shaped sections for extending under the edges of the mounting rail, the sections of the two locking slides being arranged opposite one another. So that the housing can be lifted off the mounting rail, there is provided a rotating spreading pin, which can push the two locking slides apart against the force of the springs.

An attachment device having a carrier plate made from a sheet metal part and with a clip device, which has a slide, is described in German Patent Application No. DE 94 06 386 U. In such attachment device, the clip device in addition to the U-shaped slide also has a helical compression spring, which has a spring force that pushes the end-side catch projections of the slide to under the second edge of the top-hat rail. To guide the helical compression spring, the slide has a holding crosspiece with the helical compression spring in the tensioned state being clamped between a cross leg, which has been made on the slide, and a stop angle, which is bent on the carrier plate.

However, even if such a known attachment device already fundamentally enables very reliable mounting of even larger electrical devices, it still has some disadvantages. For example, such a known attachment device employs a helical compression spring of a small size, which constitutes a separate component that must first be mounted on the slide, and that can be easily lost during installation. Moreover, the helical compression spring in the mounted state has only a relatively small spring force, since the spring constant of a helical compression spring can only be chosen to be so large that the spring can be compressed by the user with reasonable force in order to release the electrical device from the top-hat rail. The force which is necessary for pulling back the slide is in any case greater than the spring force with which the catch projections of the slide are pressed to under the second edge of the top-hat rail.

SUMMARY OF THE INVENTION

In view of the above and other problems, the exemplary embodiments of the present invention provide an improved attachment device with which even larger electrical or electronic devices can be permanently and reliably attached to a top-hat rail, and so that the attachment device can be easily produced and mounted.

Accordingly, in exemplary aspects of the present invention, there is provided an attachment device for attachment of an electrical or electronic device to a top-hat rail, including an attachable or integrated carrier plate, and a lockable fastener. The carrier plate having a holding device. The fastener axially movable relative to the carrier plate and having an elongated base region, metal catch hooks, and a spring tongue punched out of the base region. The carrier plate having a projection protruding in a direction of the fastener, and arranged corresponding to the spring tongue. In a mounted state, the spring tongue is deflected by the projection so that the catch hooks are pulled against the top hat rail by a reset force thereof.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

The embodiments of the present invention are illustrated by way of example, and not by way of limitation, in the figures of the accompanying drawings and in which like reference numerals refer to similar elements.

DETAILED DESCRIPTION OF THE INVENTION

Figure 1:
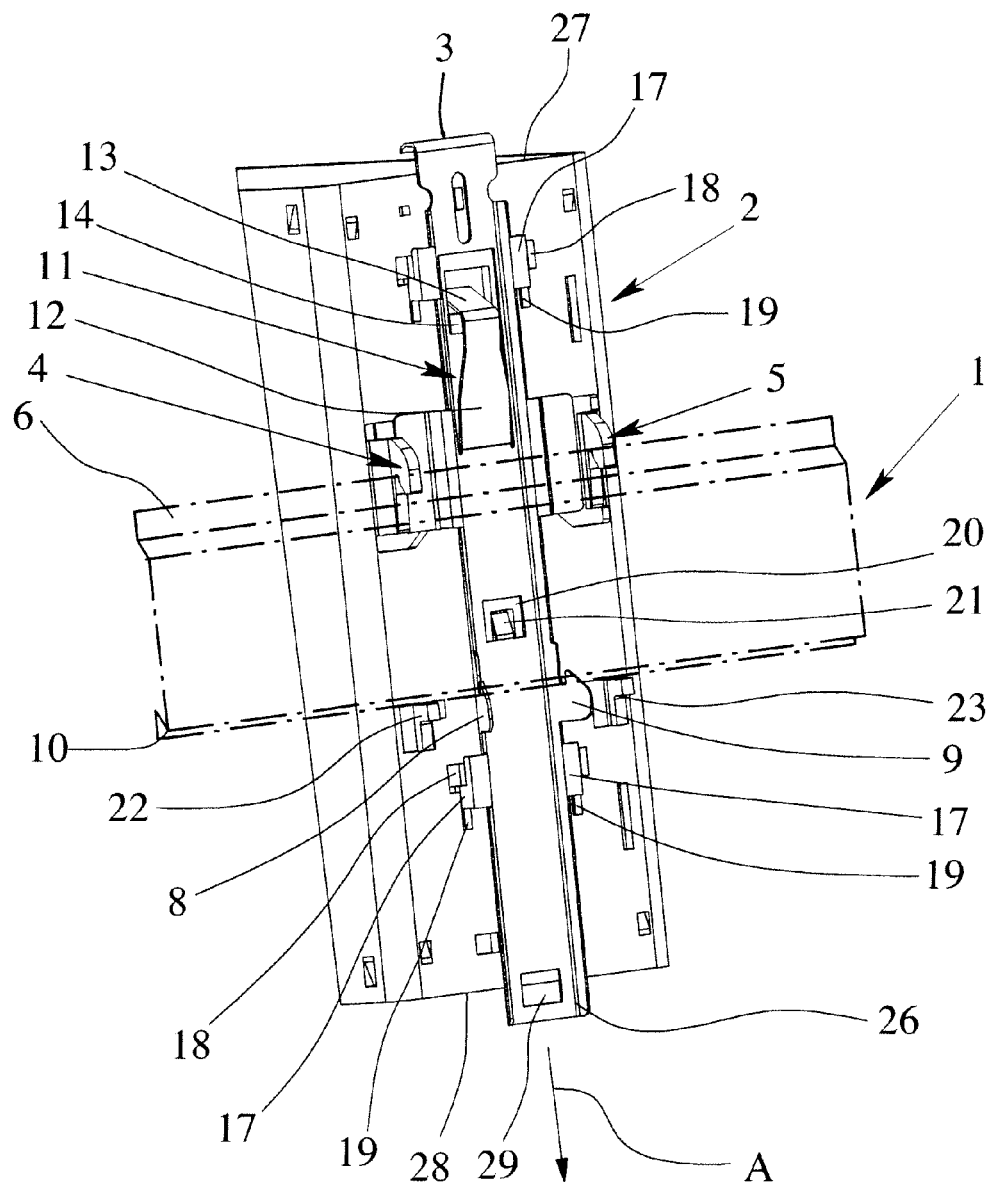
FIG. 1 shows a first embodiment of an exemplary attachment device having a carrier plate and a fastener which can be fixed thereon.

Referring now to the drawings, wherein like reference numerals designate identical or corresponding parts throughout the several views, and more particularly to FIG. 1 thereof, there is illustrated an exemplary attachment device. In FIG. 1, the exemplary attachment device is shown in the mounted state and used to attach an electrical or electronic device, such as a power supply, and the like, to a top-hat rail 1. The attachment device includes a carrier plate 2, as further shown in FIG. 2, and a bent fastener 3, for example, punched out of spring steel, and as further shown in FIGS. 3-7. The carrier plate 2 can be made either as a separate component, the carrier plate 2 then preferably being formed from a metal part, or the carrier plate 2 can be integrated as part of the device to be attached, specifically with a rear housing wall thereof.

To attach the attachment device to the top-hat rail 1, the carrier plate 2 has a holding device, which includes hooks 4, 5 that extend behind the first edge 6 of the top-hat rail 1. In the horizontal alignment of the top-hat rail 1, as shown in FIG. 1, the attachment device can thus be suspended first with the hooks 4, 5 on the top-hat rail 1. The hooks 4, 5 are punched out of the carrier plate 2 and are bent so that the hooks 4, 5 are connected in one piece to the carrier plate 2.

The fastener 3 has an elongated base region 7 and two catch hooks 8, 9, which are each bent on one lengthwise side of the base region 7, and which are arranged such that in the mounted state they encompass the second edge 10 of the top-hat rail 1, so that the attachment device is securely attached to the top-hat rail 1 by the hooks 4, 5 of the carrier plate 2 and the catch hooks 8, 9 of the fastener 3.

So that the attachment device and thus also the electrical device to be attached can be detached, if necessary, from the top-hat rail 1, the fastener 3 is located so as to be axially movable on the carrier plate 2. In the alignment of the top-hat rail 1 and the attachment device shown in FIG. 1, the fastener 3 can be moved down by applying a force in the direction of the arrow A so that the catch hooks 8, 9 release the second edge 10 of the top-hat rail 1, and thus the attachment device or the electrical device can be lifted off the top-hat rail, and for which the device can be swiveled away somewhat from the top-hat rail 1.

So that in the mounted state the fastener 3 is fixed securely on the top-hat rail 1, the fastener device 3 has a spring tongue 11, which extends in the lengthwise direction of the fastener, and which is punched out of the base region 7, and bent such that it has two sections 12, 13. As is especially apparent from FIGS. 3 and 7, the first section 12, which is connected to the base region 7 of the fastener 3, is bent away from the carrier plate 2 and the base region 7, while the second section 13 of the spring tongue 11 has the free end bent toward the carrier plate 2. The carrier plate 2 has a projection 14, which projects in the direction of the fastener 3, and which interacts with the spring tongue 11 and the second section 13 of the spring tongue 11, such that the spring tongue 11 is deflected in axial displacement of the fastener 3 in the direction of the arrow A. This results in a reset force, which provides for the catch hooks 8, 9 to be pulled against the second edge 10 of the top-hat rail 1 against the direction of the arrow A.

Figure 7:
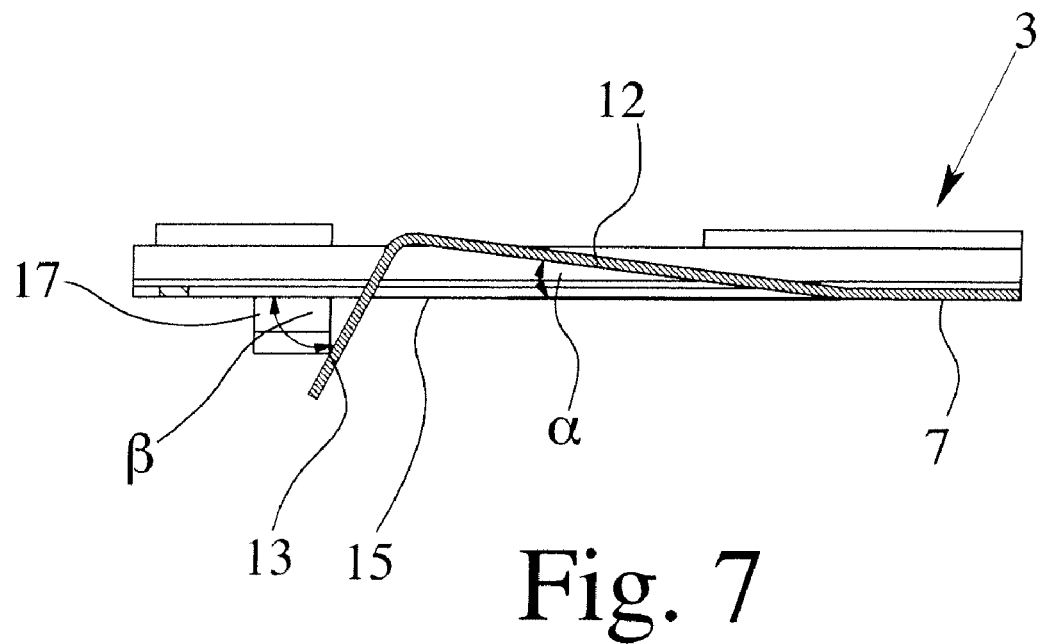
FIG. 7 is an enlarged cross section of a section of a fastener.

As follows especially from FIGS. 3 & 7, the first section 12 of the spring tongue 11 is longer than the second section 13. In addition, the angle $\alpha$ between the first section 12 and the base region 7 of the fastener 3 is smaller than the angle $\beta$ between the second section 13 and the base region 7. In other words, this means that the first longer section 12 of the spring tongue 11 is kinked less relative to the base region 7 than the second shorter section 13. This leads to the free end of the spring tongue 11 projecting through the opening 15 formed by punching out the spring tongue 11 in the base region 7.

If, at this, point the fastener 3 is deflected in the direction of the arrow A, the second section 13 of the spring tongue 11 slides along the projection 14 of the carrier plate 2, by which the spring tongue 11 is deflected. The second section 13 of the spring tongue 11 and the projection 14 on the carrier plate 2 are thus made such that even with maximum possible axial displacement of the fastener 3 in the direction of the arrow A, the free end of the spring tongue 11 still adjoins the projection 14. Together with the axially movable attachment of the fastener 3 to the carrier plate 2, this results in that the fastener 3 and thus also the catch hooks 8, 9 are pulled by the reset force of the spring tongue 11 against the direction of the arrow A so that the catch hooks 8, 9 are pressed against the second edge 10 of the top-hat rail 1.

The above described geometry of the spring tongue 11 and of projection 14, advantageously, provides for the reset force of the spring tongue 11 to be almost constant over the entire possible axial displacement path of the fastener 3. This ensures that the catch hooks 8, 9 in the mounted state of the attachment device are pulled with a relatively large and permanent force against the second edge 10 of the top-hat rail 1, so that reliable and permanent attachment of an electrical device to the top-hat rail 1 is ensured even when vibrations occur. Advantageously, the force which is necessary to move the fastener 3 into the release position (e.g., into the position in which the attachment device can be removed from the top-hat rail 1) is not so large so that it can easily be applied by hand.

Figure 2:
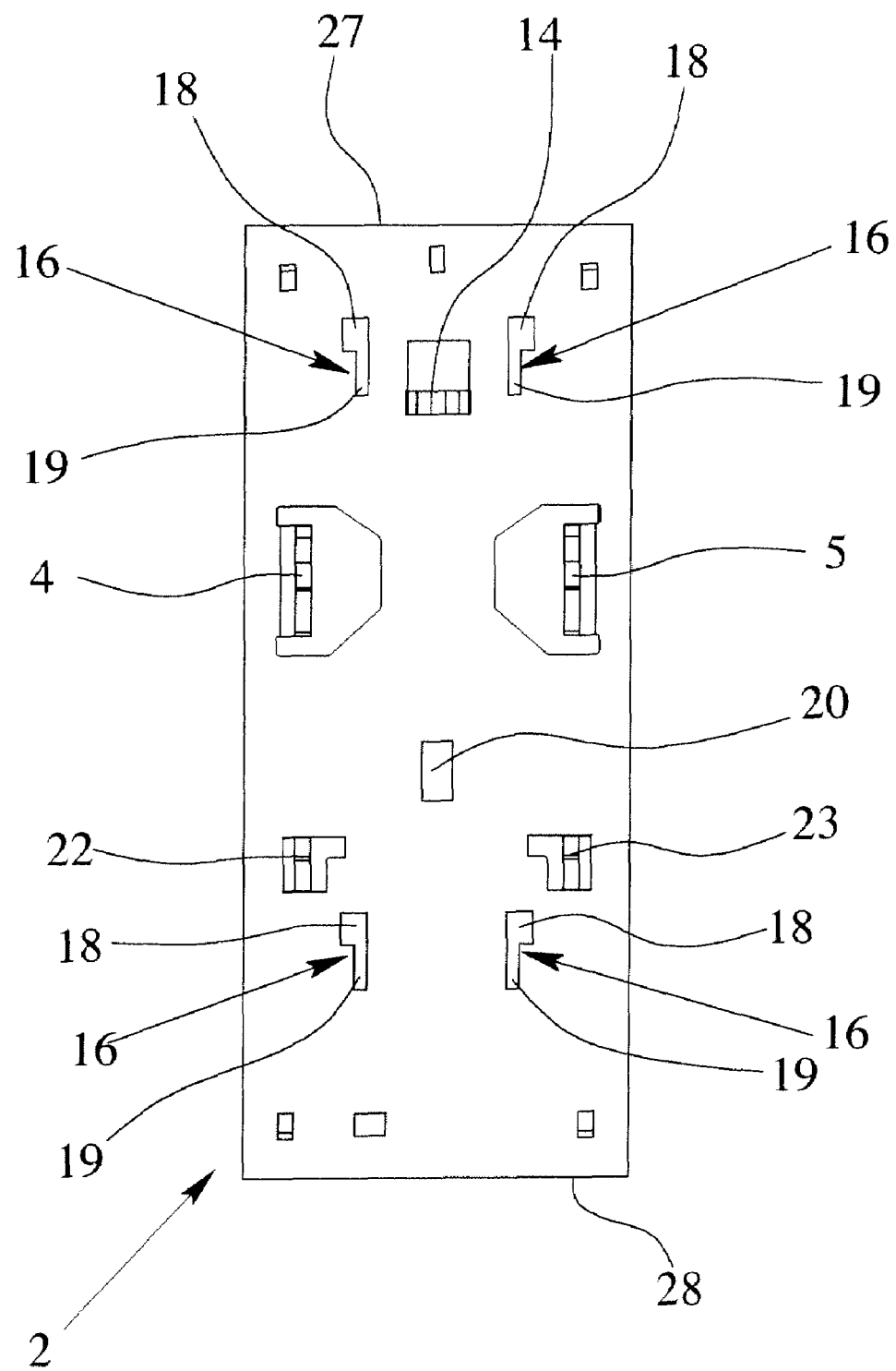
FIG. 2 shows a top view of the carrier plate of the attachment device as shown in FIG. 1.

FIGS. 1 & 2 show the carrier plate 2 having several recesses 16, which are used to hold the bent brackets 17 made on the fastener 3. The recesses 16 have a wider insertion region 18, and a subsequent narrower guide region 19. To fix the fastener 3 on the carrier plate 2, the brackets 17 can be inserted through the insertion regions 18 of the recesses 16, and then the fastener 3 can be pushed axially in the direction of the arrow A, by which the brackets 17 slide in the guide regions 19 in which the bent ends of the brackets 17 extend behind the regions of the carrier plate 2, which laterally border the guide regions 19, so that the fastener 3 is attached to be able to move axially on the carrier plate 2.

In order to prevent the fastener 3 from being unintentionally pushed back against the direction of the arrow A, in the carrier plate 2, an additional opening 20 is formed into which a fixing tongue 21 can be pressed, and which has been punched out of the base region 7 of the fastener 3. The fixing tongue 21 extends in the same lengthwise direction as the spring tongue 11, the fixing tongue 21, however, being much shorter than the spring tongue 11. If the fixing tongue 21 is pressed somewhat into the opening 20, for example, with the tip of a screwdriver, the free end of the fixing tongue 21 strikes the top edge of the opening 20, by which the axial displacement of the fastener 3 against the direction of the arrow A is prevented. Advantageously, this reliably prevents the fastener 3 from unintentionally detaching from the carrier plate 2.

FIGS. 1 & 2 further show the carrier plate 2 having two projections 22, 23, which are likewise punched out of the carrier plate 2, and are bent perpendicular to the base surface of the carrier plate 2. The projections 22, 23 have a distance from the two hooks 4, 5, which is somewhat greater than the width of the top-hat rail 1. In this way, the projections 22, 23 are used as a support for the second edge 10 of the top-hat rail 1, when the second edge 10 of the top-hat rail 1 is not encompassed by the catch hook 8, 9.

Figure 3:
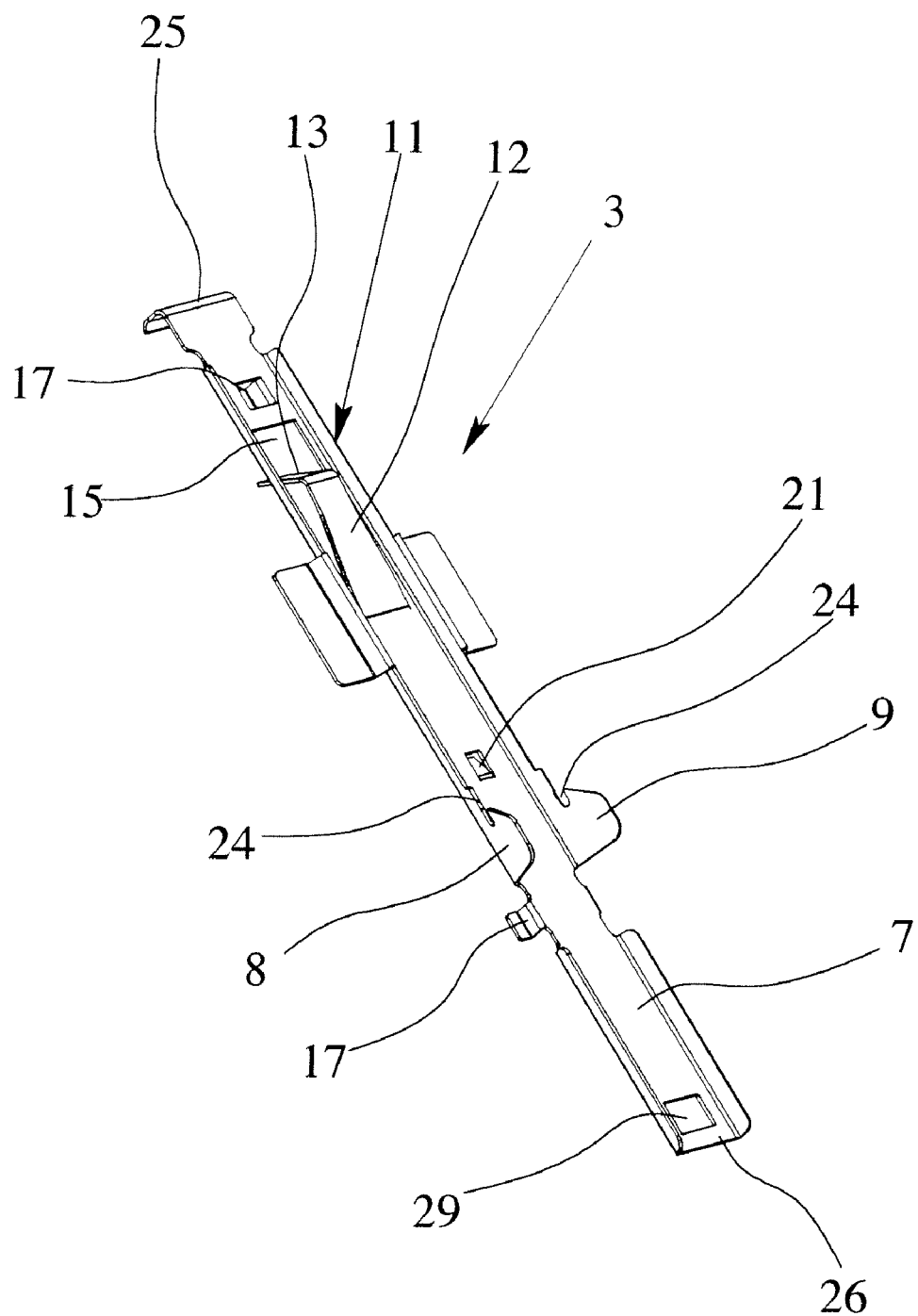
FIG. 3 is a perspective view of a first embodiment of a fastener.
Figure 4:
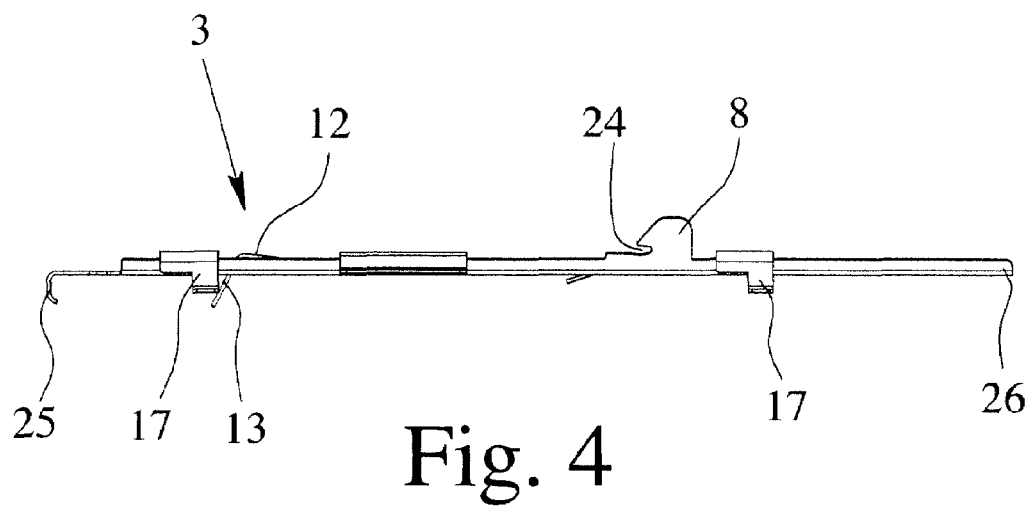
FIG. 4 is a side view of a second embodiment of a fastener.
Figure 5:
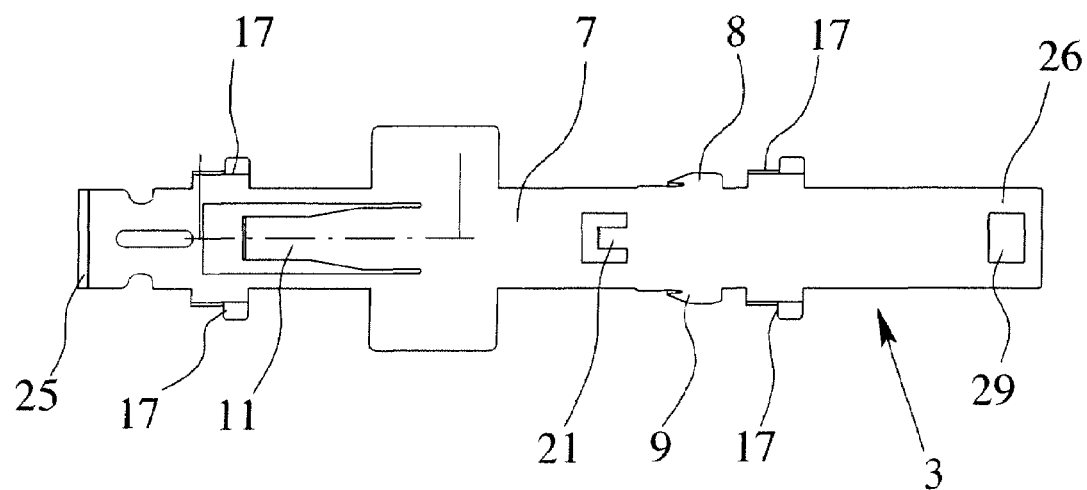
FIG. 5 is a top view of the fastener as shown in FIG. 4.
Figure 6:
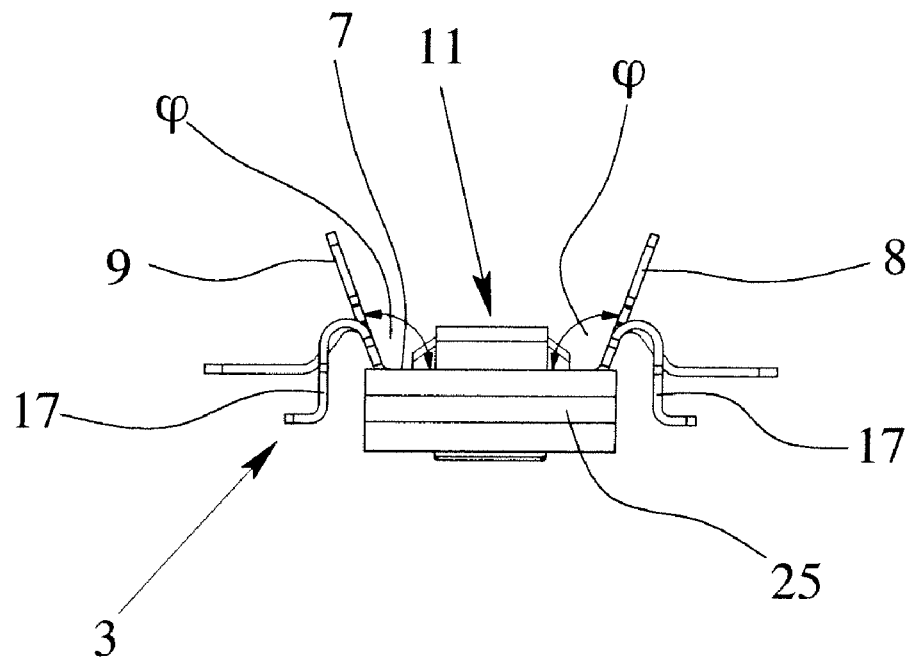
FIG. 6 is another representation of the fastener, from the front.

In particular, it is apparent from FIGS. 3 and 4 that the catch hooks 8, 9 of the fastener 3 each have a recess 24 for holding the second edge 10 of the top-hat rail 1. The recess 24 is made such that it encompasses the second edge 10 of the top-hat rail 1. In addition, the two catch hooks 8, 9 of the fastener 3 each have an angle φ greater than 90° to the base region 7 of the fastener, so that the catch hooks 8, 9 are bent in a V-shape to the outside, as shown in FIG. 6. This leads to a notch effect between the edges of the recess 24 and the second edge 10 of the top-hat rail 1, when the attachment device is moved in the lengthwise direction of the top-hat rail 1. Advantageously, this notch effect prevents unintentional slippage of the attachment device in the lengthwise direction of the top-hat rail 1. In addition, the edges of the recesses 24 are made sharp to increase the notch effect.

The fastener 3 is made as a flat, elongated metal part with a width which is relatively small compared to its length. As is apparent from FIG. 1, the length of the fastener 3 is somewhat greater than the extension of the carrier plate 2 in the lengthwise direction of the fastener 3. This leads to the two ends 25, 26 of the fastener 3 projecting over the top end 27 or the bottom end 28 of the carrier plate 2. The first end 25 of the fastener 3, which projects over the top end 27 of the carrier plate 2, is bent into a hook-shape, so that when the fastener 3 moves axially in the direction of the arrow A, and is used as a stop and thus limits the axial mobility of the fastener 3. In further exemplary embodiments, the axial mobility of the fastener 3 can also be implemented by the corresponding dimensioning of the guide regions 19 of the recesses 16, with the ends of the guide regions 19 forming a stop for the brackets 17.

In addition, the bent end 25 of the fastener 3 can also be used as a manual working surface for axial movement of the fastener 3 in the direction of the arrow A. In this way, the fastener 3 can be actuated without a tool, advantageously, providing for both tool-less mounting of the attachment device or of the electrical device on the top-hat rail 1, and also for tool-less detachment of the attachment device or of the device from the top-hat rail 1.

Further, in the second end 26 of the fastener 3, an actuation opening 29 is provided for insertion of an actuating tool, such as the tip of a screwdriver, and the like. Advantageously, this allows one to actuate (e.g., axially move) the fastener 3 selectively by hand or with a tool. Moreover, it is possible to act both on the first upper end 25 of the fastener 3 and also the second lower end 26 of the fastener 3, so that the attachment device or the electrical device can be detached from the top-hat rail 1 both from above and also from underneath. Advantageously, actuation of the fastener 3 can thus take place from a side on which there is more free space in the mounted state of the electrical device on the top-hat rail 1.

Thus, the exemplary attachment device includes a fastener having a spring tongue which extends in a lengthwise direction of the fastener and which is punched out of the base region and bent such that it has two sections, the first section which is connected to the base region being bent away from the carrier plate and the second section which has a free end being bent toward the carrier plate. The carrier plate having a projection which protrudes in the direction of the fastener and which is arranged corresponding to the spring tongue so that in the mounted state of the attachment device on the top-hat rail the spring tongue is deflected by the projection such that the catch hooks of the fastener are pulled against the second edge of the top-hat rail by the reset force of the spring tongue.

In contrast to known attachment devices, the exemplary attachment device merely includes a carrier plate, and fastener, obviating a need for a helical compression spring. The reset force employed for reliable fixing the attachment device on the top-hat rail and by which catch hooks of the fastener are pulled against the top-hat rail is implemented by a bent spring tongue, which is punched out of the fastener and in interplay with a projection made on the carrier plate. Advantageously, both the carrier plate and the fastener can be made in one piece, so that no further components are necessary, and reducing the effort in the mounting of the attachment device.

The execution of the spring tongue moreover makes it possible to optimally match the reset force to the respective requirements. In addition to the choice of the corresponding material for the fastener, this is possible especially easily by the geometrical configuration, (e.g., length, width and thickness) of the spring tongue and the projection on the carrier plate. An almost uniform reset force over the entire displacement path of the actuating element and thus also a relatively large reset force in the mounted state of the fastening device can be preferably achieved in that a first section of the spring tongue is longer than a second section and that an angle α between the first section and the base region is smaller than an angle β between the second section and the base region.

For simple attachment of the fastener to the carrier plate, it is preferably provided that the carrier plate has several recesses and the fastener has several bent brackets, which can be inserted into recesses, the bent brackets in the mounted state extending behind the recesses so that it is not possible to lift the fastener perpendicular to the base surface of the carrier plate. Alternatively, the recesses can also be made in the fastener and the brackets can be made on the carrier plate.

Preferably the recesses in the carrier plate have a wider insertion region and a narrower guide region, which can be connected to it. The guide region ensures the axial mobility of the fastener relative to the carrier plate. If the fastener is to be removed from the carrier plate, it can be moved parallel to the base surface of the carrier plate, such that the bent brackets are moved out of the guide regions into the wider insertion regions, where they can then be pulled out of the recesses. Unintentional detachment of the fastener from the carrier plate can be easily prevented by the carrier plate having a further opening and the fastener having a corresponding fixing tongue or a hook, which has been punched out of the base region. By pressing the fixing tongue or the hook into the opening in the carrier plate, the axial mobility of the fastener is limited in one direction, such that the fastener can no longer be moved into the insertion position.

Often there is the desire that the device be attached not only securely to the top-hat rail so that the device is prevented from falling off the top-hat rail, but movement of the electrical device along the top-hat rail is also to be avoided. This is especially necessary if the top-hat rail is located not horizontally, but vertically. In the exemplary attachment device, this is advantageously achieved preferably in that the two catch hooks of the fastener each have one recess for holding the second edge of the top-hat rail, so that the catch hooks are pulled not only against the end side or the bottom of the second edge of the top-hat rail by the reset force of the spring tongue, but the second edge of the top-hat rail is surrounded at least partially by the recesses. Unintentional movement of the electrical device along the support rail can be easily prevented by the recesses having sharp edges. When the electrical device is moved in the lengthwise direction of the top-hat rail, as a result of the sharp edges of the recesses, a notch effect between the recesses and the edge of the top-hat rail can be achieved, by which lateral slippage is prevented or at least made more difficult.

The notch effect to prevent lateral slippage of the attachment device on the top-hat rail can be further enhanced by the two catch hooks of the fastener being bent laterally from the base region at an angle $\phi$ greater than 90°. The two catch hooks of the fastener are tilted in a V-shape, by which the notch action is further increased when the attachment device slips laterally.

The fastener can be produced especially easily as a punched and bent part from a metal piece, especially from spring steel. Preferably, spring steel with a yield point greater than 700 N/mm$^2$ is used. Thus, both sufficient strength to ensure the desired spring properties of the spring tongue and also sufficient hardness to achieve the desired notch action are achieved. The fastener can have a width, which is relatively small compared to its length, and with the dimensions of the fastener matched to the dimensions of the respective electrical device or to the dimensions of the carrier plate.

According to a further advantageous embodiment of the exemplary attachment device, the length of the fastener is greater than the extension of the carrier plate in the lengthwise direction of the fastener. Such dimensioning of the fastener makes it possible to form on the fastener a first end which is bent in the direction to the carrier plate and which interacts with the carrier plate as a stop and thus limits the axial mobility of the fastener. The bent end can moreover also be used as an actuating thrust or for axially moving the fastener. In addition, on the second end of the fastener an actuating opening can be formed for insertion of an actuating tool. The actuating opening is used to deflect the fastener against the reset force of the spring tongue so that the catch hooks of the fastener release the second edge of the top-hat rail and the attachment device can be removed from the top-hat rail.

Accordingly, there are a host of possibilities for embodying and developing the exemplary attachment device.

While the present inventions have been described in connection with a number of exemplary embodiments, and implementations, the present inventions are not so limited, but rather cover various modifications, and equivalent arrangements, which fall within the purview of present claims.

What is claimed is:

1. An attachment device for attachment of an electrical or electronic device to a top-hat rail, the attachment device comprising:
    a carrier plate; and
    a fastener,
    wherein the carrier plate is attachable to the electrical or electronic device or in one piece with a housing of the device, and has at least one holding device for extending behind a first edge of the top-hat rail,
    wherein the fastener has an elongated base region and at least two catch hooks, which are bent down on a lengthwise side of a base region each for extending behind a second edge of the top-hat rail and made of metal,
    wherein the fastener is attachable to the carrier plate such that the fastener can be axially moved to a limited degree relative to the carrier plate,
    wherein the fastener has a spring tongue which extends in a lengthwise direction of the fastener, and which is punched out of the base region and bent such that the fastener has two sections, the first section being connected to the base region and being bent away from the carrier plate, and the second section having a free end bent toward the carrier plate, and
    wherein the carrier plate has a projection that protrudes in a direction of the fastener, which is arranged corresponding to the spring tongue,
    wherein, in a mounted state of the attachment device on the top-hat rail, the spring tongue is deflected by the projection, such that the catch hooks are pulled against the second edge of the top-hat rail by a reset force of the spring tongue.

2. The attachment device of claim 1, wherein the first section of the spring tongue is longer than the second section of the spring tongue, and wherein an angle $\alpha$ between the first section and the base region is smaller than an angle $\beta$ between the second section and the base region.

3. The attachment device of claim 1, wherein the carrier plate has several recesses, and wherein the fastener has several bent brackets which can be inserted into the recesses by which the fastener can be attached to the carrier plate.

4. The attachment device of claim 3, wherein the recesses in the carrier plate have a wider insertion region and a subsequent narrower guide region, wherein the carrier plate has an opening, wherein the fastener has a corresponding fixing tongue, which is punched out of the base region, and wherein, by pressing the fixing tongue into the opening, axial mobility of the fastener is limited, such that the fastener can no longer be moved into an insertion position in which the brackets can be inserted through the insertion region of the recesses in the carrier plate.

5. The attachment device of claim 1, wherein the holding device of the carrier plate has two punched-out hooks, which run parallel to one another.

6. The attachment device of claim 1, wherein the carrier plate has two projections, which have a distance to the holding device that is greater than the width of the top-hat rail.

7. The attachment device of claim 1, wherein the catch hooks of the fastener each have a recess for holding the second edge of the top-hat rail, the recesses having sharp edges.

8. The attachment device of claim 1, wherein two catch hooks of the fastener are each bent laterally from the base region at an angle $\phi$ greater than 90°.

9. The attachment device of claim 1, wherein the length of the fastener is greater than an extension of the carrier plate in a lengthwise direction of the fastener.

10. The attachment device of claim 9, wherein the fastener has a first end, which is bent in a direction towards the carrier plate, and which interacts with the carrier plate as a stop, limits axial mobility of the fastener.

11. The attachment device of claim 10, wherein, in a second end of the fastener, an actuating opening is formed for insertion of an actuating tool.

12. The attachment device of claim 1, wherein the carrier plate is made of metal or plastic.

13. The attachment device of claim 1, wherein the fastener is made of metal with a yield point greater than 700 N/mm$^2$.

14. The attachment device of claim 13, wherein the fastener is made as a punched out and bent part.

* * * * *